(12) United States Patent
Zhang et al.

(10) Patent No.: US 8,400,790 B2
(45) Date of Patent: Mar. 19, 2013

(54) LATCH-OFF OF REAL TIME SYNCHRONOUS RECTIFICATION FOR LIGHT LOAD CONTROL

(75) Inventors: Junming Zhang, Hangzhou (CN); Yuancheng Ren, Hangzhou (CN); Lei Miao, Hangzhou (CN); Zhaoqi Mao, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 382 days.

(21) Appl. No.: 12/824,053

(22) Filed: Jun. 25, 2010

(65) Prior Publication Data

US 2011/0006706 A1   Jan. 13, 2011

(30) Foreign Application Priority Data

Jun. 25, 2009   (CN) .......................... 2009 1 0059751

(51) Int. Cl.
  *H02M 3/335*   (2006.01)
(52) U.S. Cl. ..................................... 363/21.14; 363/127
(58) Field of Classification Search ............... 363/21.14, 363/127
  See application file for complete search history.

(56) References Cited

U.S. PATENT DOCUMENTS

| | | | |
|---|---|---|---|
| 7,599,198 B2 * | 10/2009 | Tao et al. ........................ | 363/17 |
| 7,869,231 B2 * | 1/2011 | Cohen ......................... | 363/21.14 |
| 8,203,812 B2 * | 6/2012 | Su .................................. | 361/18 |
| 8,243,473 B2 * | 8/2012 | Chen et al. ...................... | 363/16 |

* cited by examiner

*Primary Examiner* — Shawn Riley
(74) *Attorney, Agent, or Firm* — Perkins Coie LLP

(57) ABSTRACT

The present invention discloses a light load control circuit and the method accordingly where the synchronous rectification is latched off selectively according to the gate voltage of the synchronous rectifier.

23 Claims, 12 Drawing Sheets

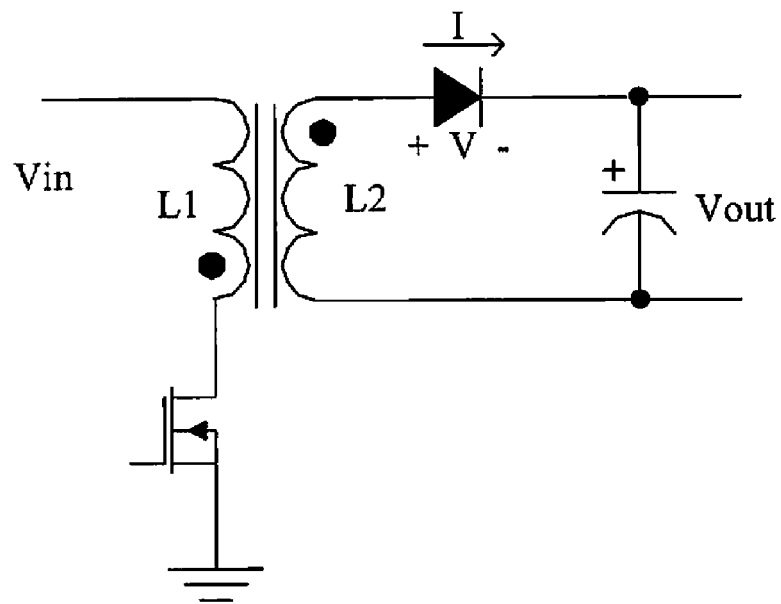
FIG. 1A *(Prior Art)*
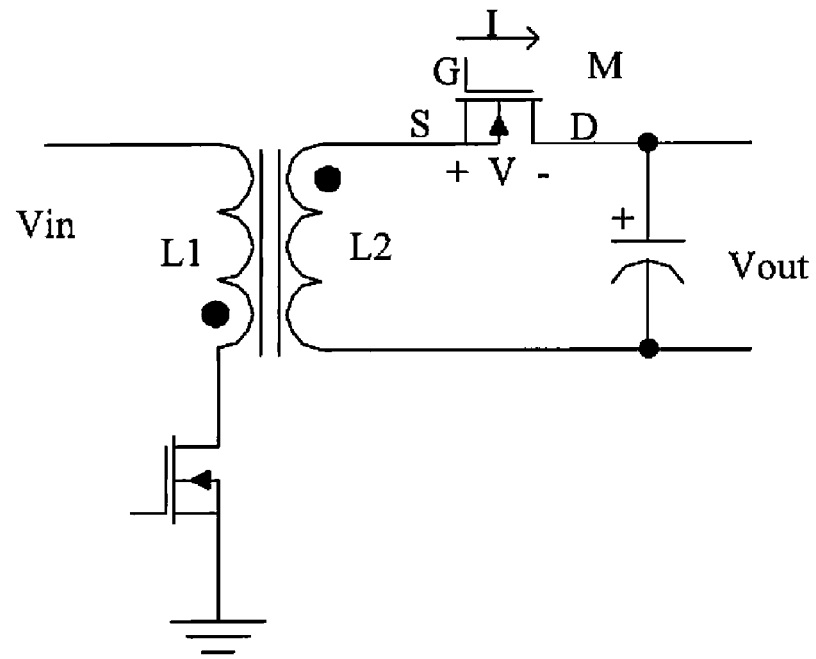
FIG. 1B *(Prior Art)*

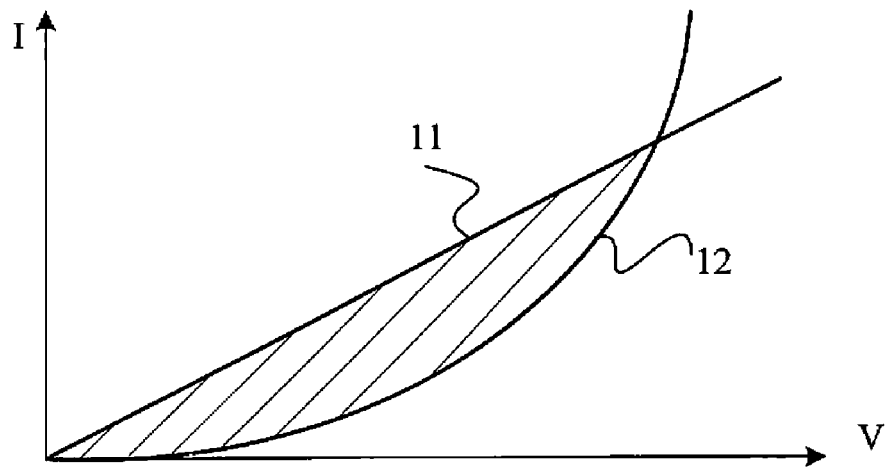
FIG. 1C *(Prior Art)*
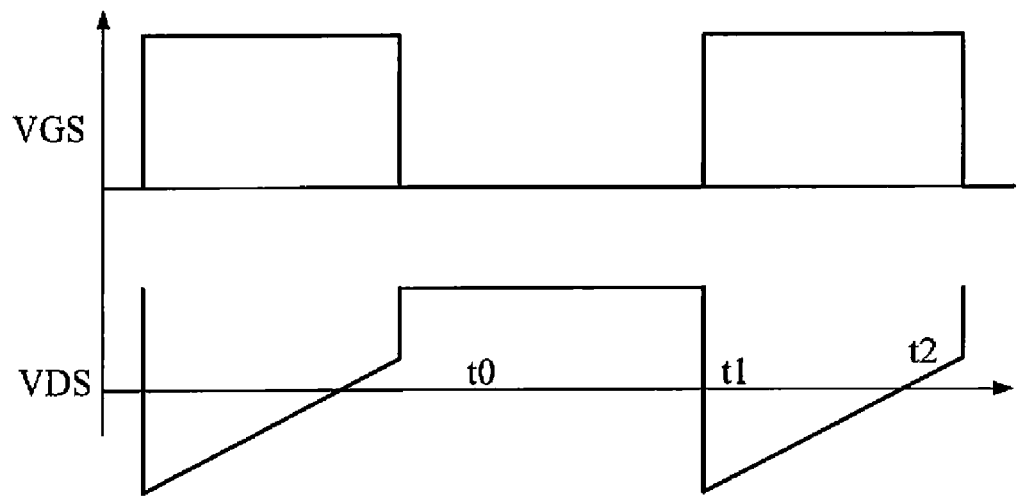
FIG. 2 *(Prior Art)*

LATCH-OFF OF REAL TIME SYNCHRONOUS RECTIFICATION FOR LIGHT LOAD CONTROL

CROSS REFERENCE TO RELATED APPLICATIONS

This application claims priority to and the benefit of Chinese Patent Application No. 200910059751.X, filed Jun. 25, 2009, which is incorporated herein by reference in its entirety.

TECHNICAL FIELD

In general, two rectifying schemes are used in a flyback converter, non-synchronous rectification which requires a diode as seen in prior art FIG. 1A and synchronous rectification which rectifies the current through controlling on/off of a synchronous rectifier, e.g. an N-MOSFET M, as seen in prior art FIG. 1B. When a high voltage is applied to the gate of an N-MOSFET, a channel forms and the N-MOSFET is turned on with very low ON resistance. When the gate is floating or a low voltage is applied, the drain-source resistance of the MOSFET is high.

Prior art FIG. 1C shows the voltage-current characteristic for a diode (curve 12) and for a synchronous rectifier (curve 11). In practical application, the operational region of flyback power converter falls into the cross-hatched area where curve 11 is above curve 12. That is, the ON resistance of a synchronous rectifier is less than that of its body diode. Thus, synchronous rectification is widely used to save power.

However, during light load conditions, the power saved by the synchronous rectification is minor, and is even less than the power consumed by the synchronous rectification driver. For this reason, it is usual to "latch off" the synchronous rectification function to save the driver loss. For a synchronous rectifier, typically a MOSFET, the body diode is used during the non-synchronous rectification where the positive current flows through the body diode of the MOSFET, instead of the channel which appears only when the MOSFET is actuated during synchronous rectification.

A conventional synchronous rectification method and its light load control solution will be described according to FIG. 1B and prior art FIG. 2. Assume that the secondary rectifier M is under synchronous rectification. At time t0, the primary side switch P is on, the secondary rectifier M is off with low gate voltage V. At that time, the drain-source voltage $V_{DS}$ is positive and the body diode of the secondary rectifier M is reverse-biased. At time t1, the primary side switch is turned off, and then the secondary rectifier M is turned on entirely with high gate voltage, current flows from the source to the drain and $V_{DS}$ is negative. As time elapses, $V_{GS}$ remains constant high, and $V_{DS}$ increases. The lighter the load, the quicker the voltage $V_{DS}$ increases. After $V_{DS}$ becomes negative at time t1, a blanking time is added. At the end of the blanking time t2, the drain-source voltage $V_{DS}$ of the rectifier M is sensed and compared to a predetermined voltage such as "zero" voltage. If $V_{DS}$>0, a light load condition is determined and synchronous rectification is latched off into non-synchronous rectification. Then, the rectifier M is turned off with low $V_{GS}$. $V_{GS}$ keeps low (OFF state) for the following cycles.

During the non-synchronous rectification, after $V_{DS}$ changes from a positive value to a negative value, and another blanking time is added. At the end of the blanking time, $V_{DS}$ is compared with the predetermined value such as "zero" voltage. If $V_{DS}$<0, heavy load condition is determined and synchronous rectification is active again.

However, when the load is at a "border" condition, system will shift frequently between the synchronous rectification and non-synchronous rectification. This situation lowers the efficiency of the system. The rectification mode changes based on only one cycle of light load condition, this is unreliable and is susceptible to signal spikes. Furthermore, during the light load condition, the current at the secondary side will become negative before the rectifier M is turned off, which also lowers efficiency.

Besides, with the conventional synchronous rectification, the gate voltage is either HIGH or LOW. During light load condition, the rectifier trends to be turned off too late with reverse current.

BRIEF DESCRIPTION OF THE DRAWINGS

Non-limiting and non-exhaustive embodiments are described with reference to the following drawings. These drawings are not necessarily drawn to scale. The relative sizes of elements illustrated by the drawings may differ from the relative size depicted.

FIG. 1A shows a prior art non-synchronous rectifying scheme applied in a flyback converter.

FIG. 1B shows a prior art synchronous rectifying scheme applied in a flyback converter.

FIG. 1C shows a prior art voltage-current characteristics of a diode (curve 12) and a synchronous rectifier (curve 11).

FIG. 2 shows a timing diagram illustrating the circuit of FIG. 1B.

DETAILED DESCRIPTION

Various embodiments of the present invention are now illustrated in following figures using terms commonly employed by those skilled in the art. It will be understood that they are not intended to limit the invention to these embodiments. The invention can be practiced without one or more of the specific details, or with other methods, components, materials, process steps, or operations are not shown or described in detail in order not to obscure aspect of the invention.

Figure 3:
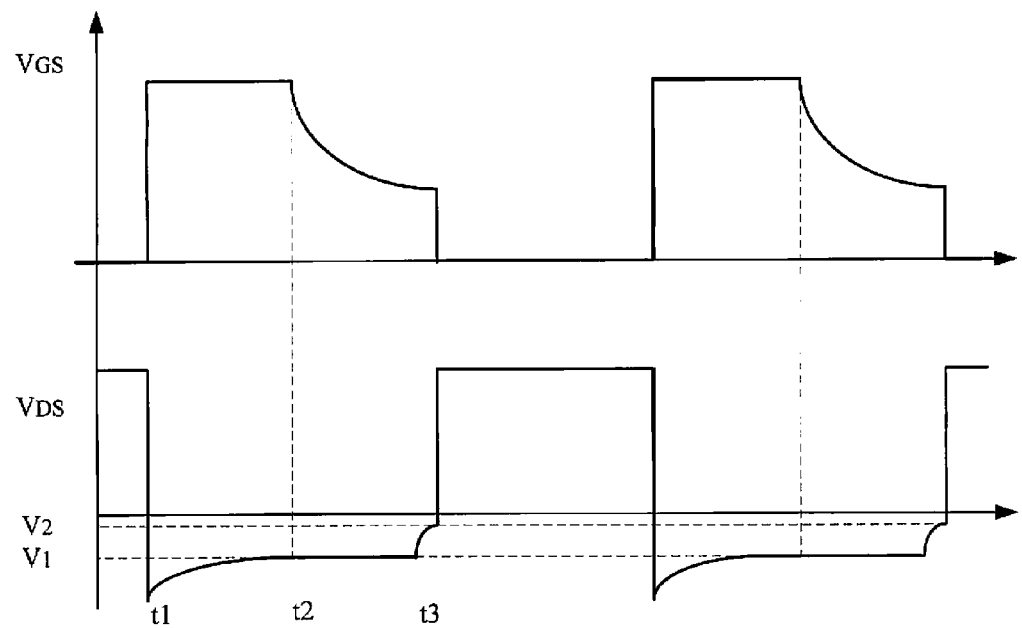
FIG. 3 shows a real time synchronous rectification in accordance with a disclosed embodiment.

FIG. 3 is a voltage timing diagram of a real time synchronous rectification method. For the real time synchronous rectification, for at least one period, the gate voltage $V_{GS}$ changes continuously instead of either HIGH or LOW (as shown in FIG. 2) to regulate the drain-source voltage $V_{DS}$.

At time t1, the gate voltage of the rectifier $V_{GS}$ is set HIGH, and the rectifier is turned on. At time t2, $V_{DS}$ increases to $V_1$. Then, $V_{DS}$ is kept at $V_1$ by gradually decreasing the gate voltage $V_{GS}$. When the current becomes quite small, $V_{DS}$ decreases to $V_2$, and the rectifier is turned off by setting $V_{GS}$ LOW. During the real time synchronous rectification, the lighter the load, the quicker $V_{GS}$ decreases.

Figure 4:
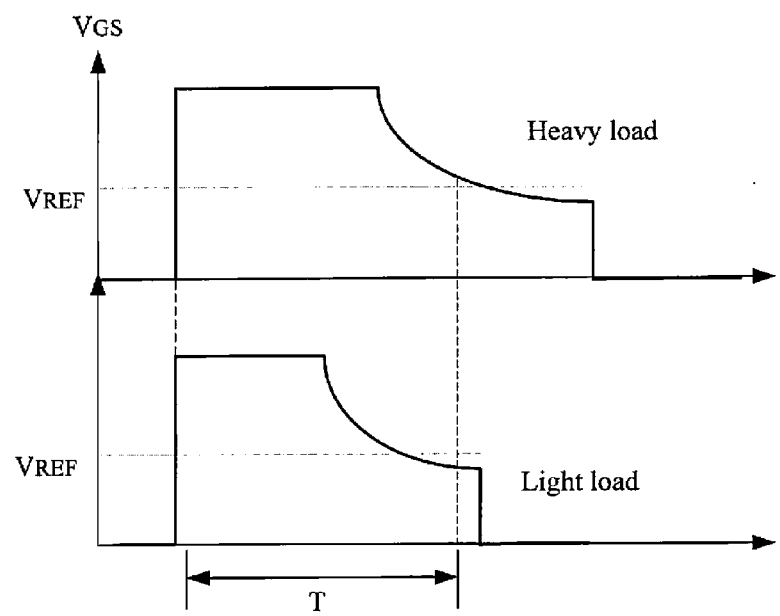
FIG. 4 shows a load condition judgment method for the real time synchronous rectification of FIG. 3.

FIG. 4 through FIG. 7B relates to a first type of light load control method. It selectively latches off synchronous rectification according to the level of the input voltage of the rectifier. In the example shown, the input voltage is the gate voltage of the synchronous rectifier. FIG. 4 illustrates a method of determining the load condition for the real time synchronous rectification. When the rectifier is synchronously turned on, a blanking time is added and starts. If the blanking time is a period of T, at the end of the blanking time T, the gate voltage $V_{GS}$ is sensed and compared to a threshold voltage $V_{REF}$. If $V_{GS}>V_{REF}$, it represents a heavy load condition. If $V_{GS}<V_{REF}$, it represents a light load condition. Only when the light load condition lasts for several successive cycles which exceeds a time of ΔT, the synchronous rectification is latched off into non-synchronous rectification. After entering into non-synchronous rectification, the rectifier is turned back into synchronous rectification once every N cycles or every time period of T0. The term "once" here means one cycle as a typical example. When the rectifier is in synchronous rectification after the n cycles of non-synchronous rectification, $V_{GS}$ is sensed and compared to $V_{REF}$ as illustrated above.

Figure 5:
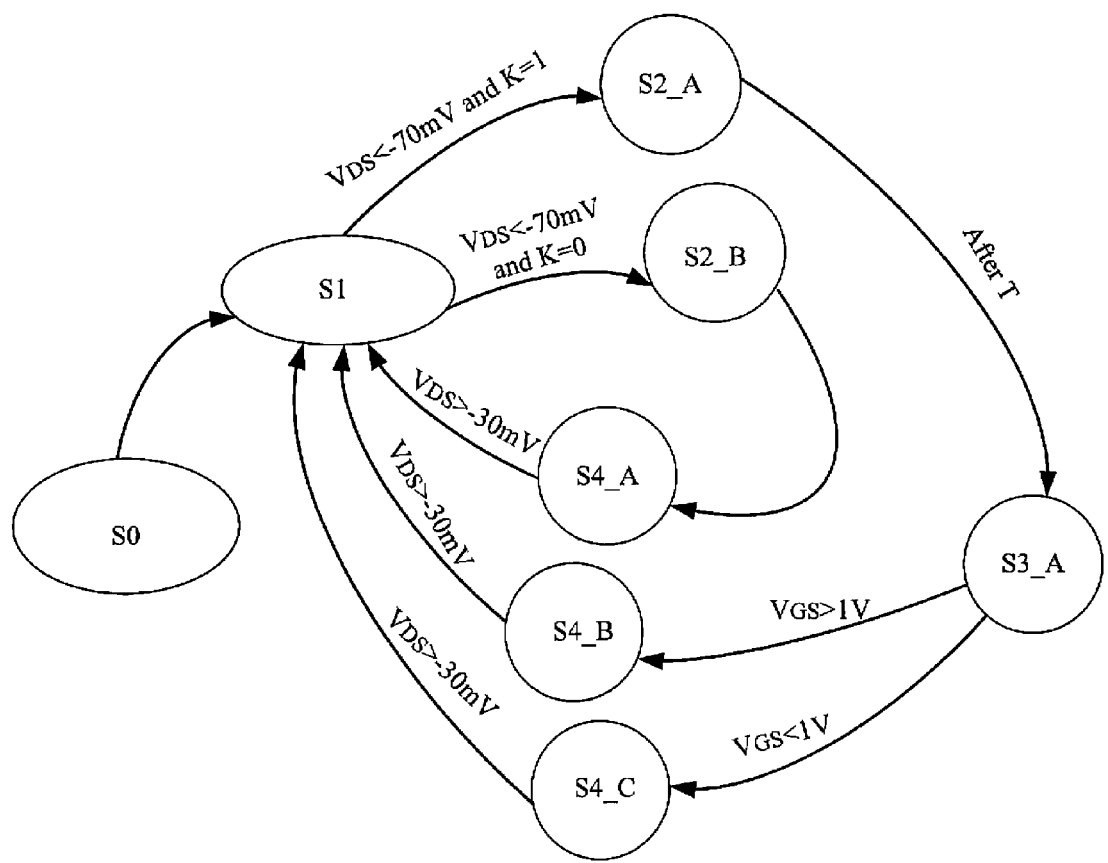
FIG. 5 shows a state diagram for a light load control method.

FIG. 5 shows a state diagram of the light load control method. The nodes of S0 to S4_C represent respectively as follows:

S0: startup, setting K=1;
S1: OFF state (no current flows through the rectifier);
S2_A: ON state of the synchronous rectifier (current flows synchronously);
S2_B: ON state of the body diode (current flows non-synchronously);
S3_A: sensing $V_{GS}$;
S4_A: keeping K=0 and setting K=1 every N cycles or every time period of T0;
S4_B: holding on K;
S4_C: keeping K=1, if light load condition sensed ($V_{GS}<1$) for several successive cycles which exceeds a time of ΔT, setting K=0.

Every cycle of the flow chart represents a cycle period of the rectification where in one cycle period, the rectifier or the body diode is ON and OFF one time. K is a light load control signal where if K=1, it is in synchronous rectification for the next cycle and if K=0, it is in non-synchronous rectification for the next cycle.

At node S0, the controller starts up, and K is set to 1 for entering into synchronous rectification for the next cycle. At node S1, no current flows through the rectifier, that is, the rectifier is in OFF state. When positive current flows through the body diode of the rectifier and $V_{DS}<-70$ mV, if K=1, the rectifier is turned on synchronously at node S2_A. If K=0, current flows through the body diode of the rectifier at node S2_B.

A blanking time of T is added at node S2_A. At the end of the blanking time T, $V_{GS}$ is sensed at node S3_A and is compared with a reference voltage $V_{REF}$. In one example, $V_{REF}=1V$. If $V_{GS}>1V$, heavy load condition is determined, K=1 remains at node S4_B. If $V_{GS}<1V$, light load condition then is determined. K remains HIGH (K=1) at first. However, if light load condition lasts for several successive cycles which exceeds a time of ΔT, K is set LOW (K=0) at node S4_C. Then, non-synchronous rectification will be performed during the next cycle.

If the converter works under non-synchronous rectification at node S2_B, then at node S4_A, firstly, K is kept LOW (K=0). After n cycles, K is set HIGH (K=1) and enters synchronous rectification in the next cycle. In one embodiment, for the next cycles, the converter enters into node S2_A. In another embodiment, if light load condition is sensed in the next cycle, K is set back LOW (K=0) and this procedure is repeated. In other words, K is set HIGH (K=1) every N cycles and is set back LOW in the following cycles.

After Node S4_A, S4_B and S4_C, the rectifier is in OFF state at node S1. For synchronous rectification, if $V_{DS}>-30$ mV, the rectifier is turned off at S1, and for non-synchronous rectification, current decreases to zero at node S1.

Figure 6:
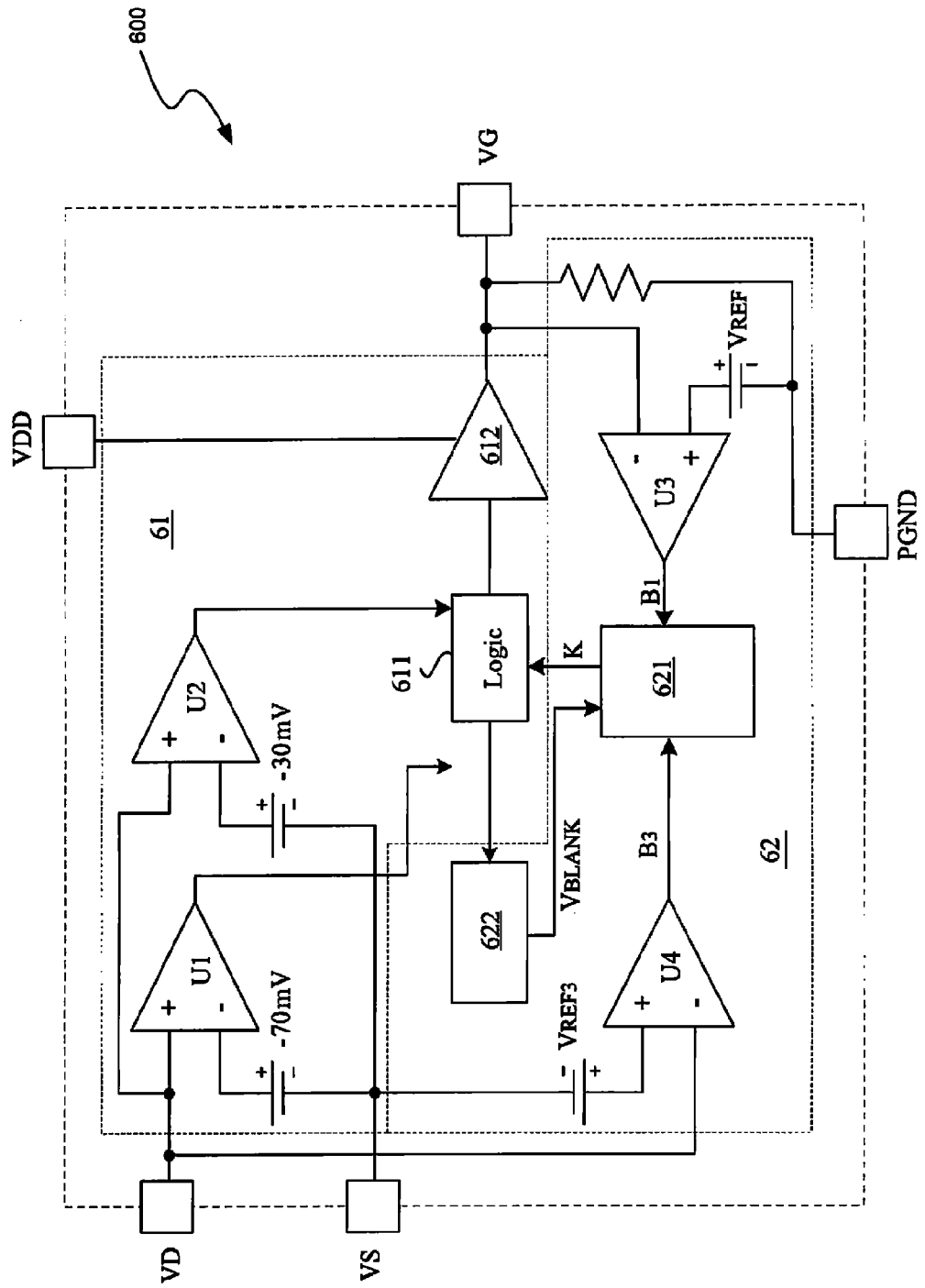
FIG. 6 shows a control circuit implementing the control method of FIG. 5.

FIG. 6 shows a control circuit 600 according to the control method of FIG. 5. The control circuit 600 comprises external terminals of VD, VS, VG, VDD and PGND, which are connected to the drain of the rectifier, the source of the rectifier, the gate of the rectifier, the power supply of the control circuit 600 and the ground of the control circuit 600 respectively. The control circuit 600 comprises a synchronous rectification circuit 61 and a light load control circuit 62. The synchronous rectification circuit 61 generates an interim synchronous rectification signal. In one example, the synchronous rectification signal is illustrated in the form of the $V_{Gs}$ signal shown in FIG. 3.

The synchronous rectification circuit 61 comprises in one embodiment a transconductance amplifier U1 and a comparator U2. The transconductance amplifier U1 is connected to the VD terminal at its non-inverting terminal and a reference signal (-70 mV as an example) at its inverting terminal. The comparator U2 is connected to the VD terminal at its non-inverting terminal and another reference signal (-30 mV as an example) at its inverting terminal. The transconductance amplifier U1 is used to turn on a synchronous rectifier and the comparator U2 is used to turn off the synchronous rectifier. The synchronous rectification circuit 61 further comprises in one embodiment the driving logic circuit 611 and the driving circuit 612. The driving logic circuit 611 receives at its inputs the output of the transconductance amplifier U1, the output of the comparator U2, and the light load control signal K from the light load control circuit 62. The driving logic circuit 611 puts out a driving signal to the driving circuit 612, and an ON signal to the light load control circuit 62. The ON signal represents the start of the ON state of the synchronous rectifier. The driving circuit 612 puts out a gate control signal at the VG terminal. The driving logic circuit 611 further generates the interim synchronous rectification signal according to the output of U1 and U2.

Continuing with FIG. 6, the light load control circuit 62 latches off synchronous rectification during the duration of the light load condition. The light load control circuit 62 comprises a gate voltage comparator U3, a blanking time circuit 622 and a latching circuit 621. The comparator U3 compares $V_{GS}$ with a reference voltage $V_{REF}$. The inverting terminal of U3 is connected to the terminal VG, and the non-inverting terminal receives $V_{REF}$. U3 outputs a signal $B_1$ to the latching circuit 621. In one embodiment as shown in FIG. 6, the light load control circuit 62 further comprises a drain-source voltage comparator U4. The comparator U4 compares $V_{DS}$ with a reference voltage $V_{REF3}$. The inverting terminal of U4 is connected to the terminal VD. The non-inverting terminal of U4 is connected to a reference voltage $V_{REF3}$ where the other end of $V_{REF3}$ is connected to the terminal VS. U4 outputs a signal $B_3$ to the latching circuit 621. The blanking time circuit 622 receives the ON signal from the driving logic circuit 611 and puts out a blanking signal $V_{BLANK}$ to the latching circuit 621. $V_{BLANK}$ is set HIGH at the start of the ON state of the rectifier. The HIGH level of $V_{BLANK}$ lasts a time of T.

The latching circuit 621 puts out the light load control signal K to the driving logic circuit 611. In one embodiment, the driving logic circuit 611 comprises an AND gate where the inputs of the AND gate receives the light load control circuit K and the interim synchronous rectification signal. And the output of the AND gate is connected to the driving circuit 612. When K=0, synchronous rectification is latched off. Then $V_{GS}$ is LOW for the next cycle and the rectifier entering into non-synchronous rectification. When K=1, the rectifier works under synchronous rectification for the next cycle.

Figure 7A:
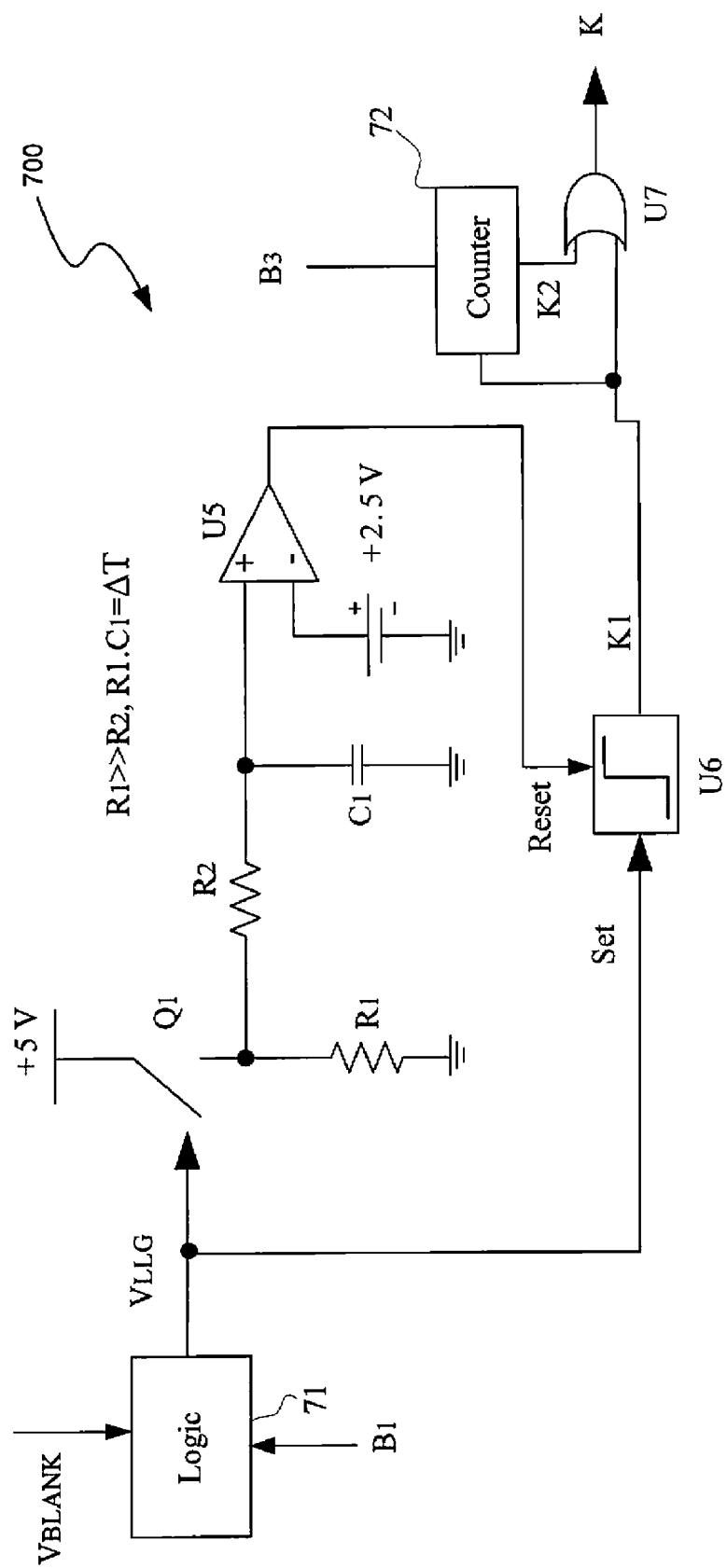
FIG. 7A shows a latching circuit of the control circuit of FIG. 6.

FIG. 7A shows an embodiment of a latching circuit 700. The latching circuit 700 comprises a light load logic circuit 71, a charging circuit comprised of the resistor $R_1$, $R_2$ and a capacitor $C_1$. The latching circuit 700 further comprises a switch $Q_1$, a comparator U5 and a monostable trigger U6. In another embodiment, the latching circuit 700 further comprises a counter 72 and an OR gate U7. The light load logic circuit 71 receives signal $B_1$ from the gate voltage comparator U3 and $V_{BLANK}$ from the blanking time circuit, and puts out a load indication signal $V_{LLG}$.

Figure 7B:
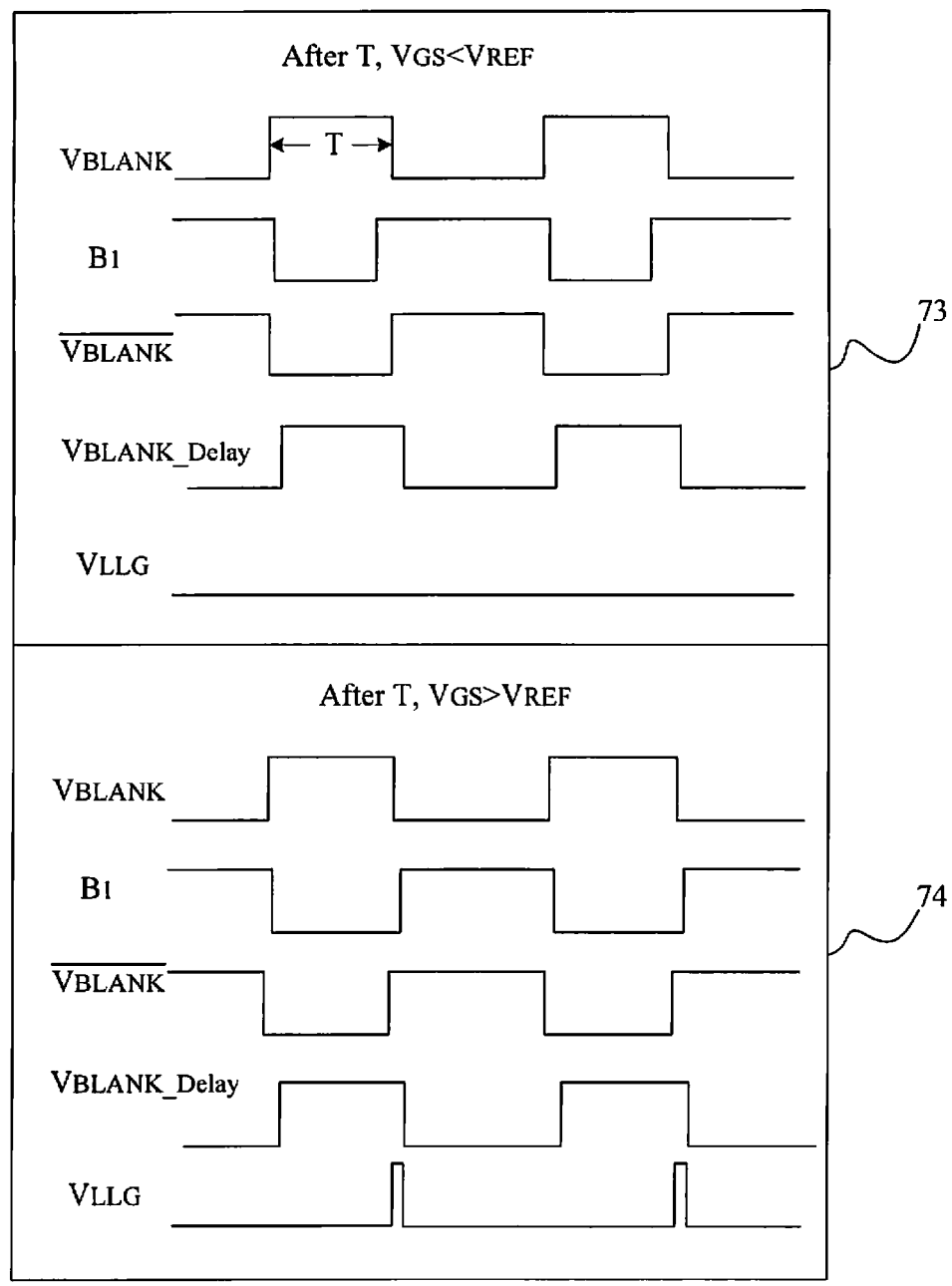
FIG. 7B shows a timing diagram of the light load logic circuit of the latching circuit of FIG. 7A.
Figure 8:
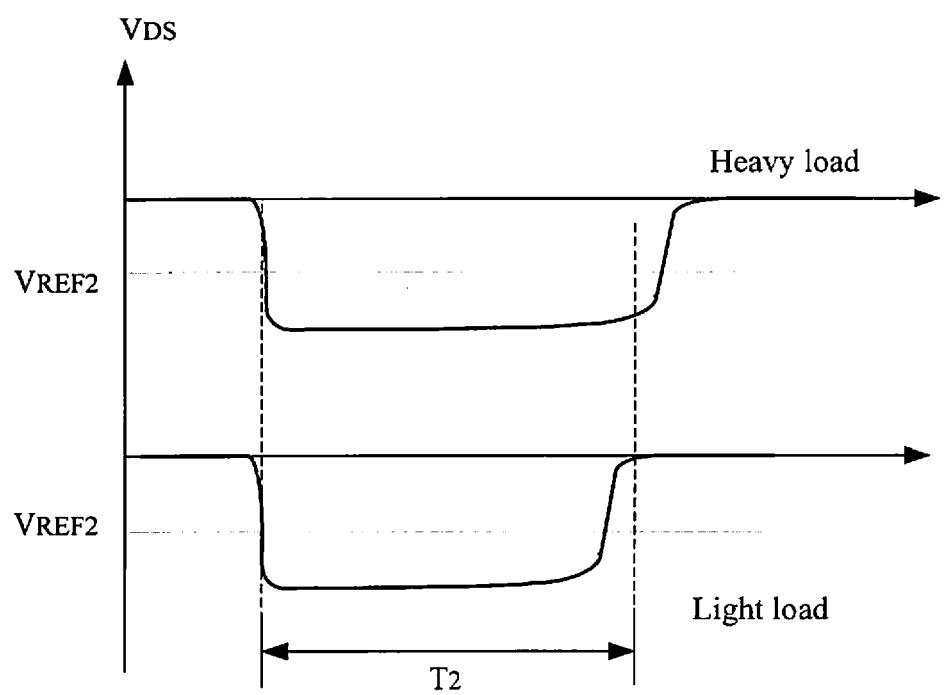
FIG. 8 shows another load condition judgment method for real time synchronous rectification.

In one embodiment, the logic of the light load logic circuit 71 is shown in FIG. 7B illustrated by the waveforms. $V_{LLG}$ is determined by $V_{GS}$. At the falling edge of $V_{BLANK}$, in light load condition, $V_{GS}<V_{REF}$, $B_1$ is HIGH, and $V_{LLG}$ keeps LOW (referring to the upper diagram 73). In heavy load condition, $V_{GS}>V_{REF}$, $B_1$ is LOW, and $V_{LLG}$ will present a positive pulse (referring to the bottom diagram 74). $V_{LLG}$ is determined by a function of: $V_{LLG}=\overline{B_1} \times \overline{V_{BLANK}} \times V_{BLANK\_Delay}$; where in $V_{BLANK\_Delay}$ has a same waveform as $V_{BLANK}$ but delays a predetermined short time.

Referring back to FIG. 7A, at the leading edge of $V_{LLG}$, U6 is set HIGH (K1=1). Meanwhile, $Q_1$ is turned on and $C_1$ is charged (to 5V as an example). When $V_{LLG}$ is LOW, $C_1$ is discharged through $R_1$ and $R_2$ wherein $R_1$ is substantially larger than $R_2$ and $R_1 * C_1 = \Delta T$. As a result, when $V_{LLG}$ is LOW for a time of $\Delta T$, $C_1$ is discharged below a reference voltage (2.5V as an example), then U5 puts out LOW and reset U6 (K1=0).

In one embodiment, K1 is the light load control signal and after the rectifier enters into non-synchronous rectification, the rectifier goes back to synchronous rectification after a period of T0.

In another embodiment, the light load control signal K is set as the OR of K1 and K2: K=K1+K2, where K2 is the output of the counter 72. For this control, after the rectifier enters into non-synchronous rectification, the rectifier goes back to synchronous rectification after a several cycles. The counter 72 increments by 1 at each falling edge of $B_3$, i.e., the counter 72 increments each cycle. In one example, $V_{REF3}$ is set to −0.5V. In one embodiment, the light load control circuit 62 does not comprise the comparator U4, the counter 72 receives the signal from U1. When the counter 72 sums up to N, the counter 72 overflows and puts out a HIGH pulse K2. The width of pulse K2 ensures that the rectifier entering into synchronous rectification for one cycle. In another embodiment, the falling edge of K2 is triggered by the leading edge of $B_3$ to ensure one cycle of synchronous rectification. After overflowing, the counter 72 is reset by the falling edge of K1 and starts to count from 0. The cycle number N is set 10 in one example.

FIG. 8 through FIG. 11B relates to a second type of light load control method. It latches off synchronous rectification by judging the levels of input voltage and enters back to synchronous rectification by judging the level of the output voltage of the rectifier. In one example, the input voltage is the gate voltage of the rectifier and the output voltage is the drain-source voltage. During synchronous rectification, the gate voltage $V_{GS}$ is sensed and compared to the reference voltage $V_{REF}$ after a blanking time of T1 from the ON state of the rectifier to determine the load condition. During non-synchronous rectification, referring to FIG. 8, the drain-source voltage is sensed to determine the load condition.

When current starts to flow through the body diode, a blanking time is added and starts. If the blanking time is a period of T2, at the end of T2, the drain source voltage $V_{DS}$ is sensed and compared to a threshold voltage $V_{REF2}$. If $V_{DS}<V_{REF2}$, it represents a heavy load condition. The rectifier enters into synchronous rectification for the next cycle. If $V_{DS}>V_{REF2}$, it represents a light load and non-synchronous rectification continues. In one embodiment, T1<T2. In another embodiment, T1=T2.

Figure 9:
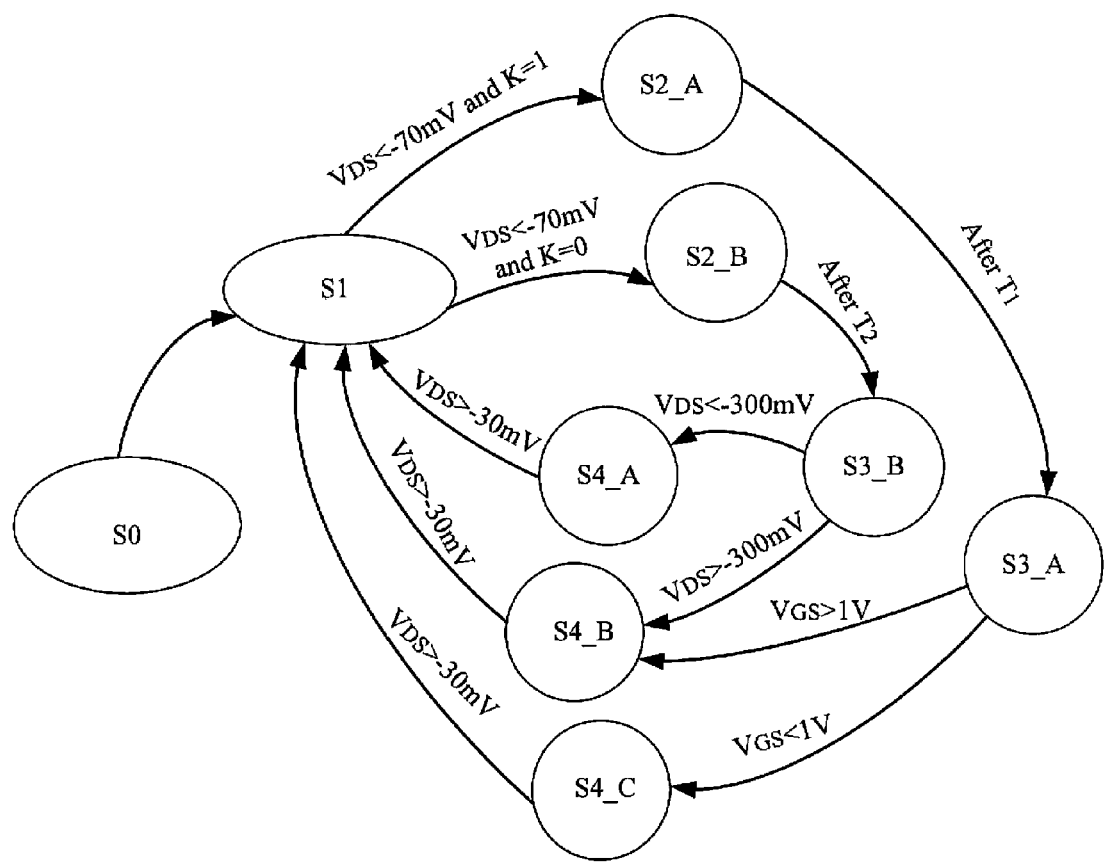
FIG. 9 shows a state diagram for a light load control method of FIG. 8.

FIG. 9 shows a state diagram for a light load control method. The nodes of S0 to S4_C represent respectively as follows:
S0: startup, setting K=1;
S1: OFF state (no current flows through the rectifier);
S2_A: ON state of the rectifier (current flows synchronously);
S2_B: ON state of the body diode (current flows non-synchronously);
S3_A: sensing $V_{GS}$;
S3_B: sensing $V_{DS}$;
S4_A: setting K=1;
S4_B: holding on K;
S4_C: keeping K=1, if light load condition sensed ($V_{GS}<1$) for several successive cycles which exceeds a time of $\Delta T$, setting K=0.

Every cycle of the flow chart represents a cycle period of the rectification where in one cycle period, the rectifier or the body diode is ON and OFF once each.

At node S0, the controller starts up, and K is set to 1 entering synchronous rectification for the next cycle. At node S1, no current flows through the rectifier, that is, the rectifier is in OFF state. When positive current flows through the body diode of the rectifier and $V_{DS}<−70$ mV, if K=1, the rectifier is turned on synchronously at node S2_A. If K=0, current flows through the body diode of the rectifier at node S2_B.

A blanking time of T1 is added at node S2_A. At the end of the blanking time T1, $V_{GS}$ is sensed at node S3_A and is compared to a reference voltage $V_{REF1}$. In one example, $V_{REF1}=1V$. If $V_{GS}>1V$, heavy load condition is detected, and K=1 remains at node S4_B. If $V_{GS}<1V$, light load is detected. K remains HIGH (K=1) initially. However, if light load condition lasts for several successive cycles with time of $\Delta T$, K is set LOW (K=0) at node S4_C. Then, non-synchronous rectification will be performed during the next cycle.

If the converter works under non-synchronous rectification at node S2_B, a blanking time of T2 is added at node S2_B. At the end of the blanking time T2, $V_{DS}$ is sensed at node S3_B and is compared to a reference voltage $V_{REF2}$. In one example, $V_{REF2}=−300$ mV (assuming the ON voltage of the body diode is about −700 mV). If $V_{DS}<V_{REF2}$, heavy load condition is detected, and K is set HIGH (K=1) at node S4_A. If $V_{DS}$>$V_{REF2}$, light load condition is detected. K remains LOW (K=0) at node S4_B.

After Node S4_A, S4_B and S4_C, the rectifier is in OFF state at node S1. For synchronous rectification, if $V_{DS}$>−30 mV, the rectifier is turned off at S1, and for non-synchronous rectification, current decreases to zero at node S1.

Figure 10:
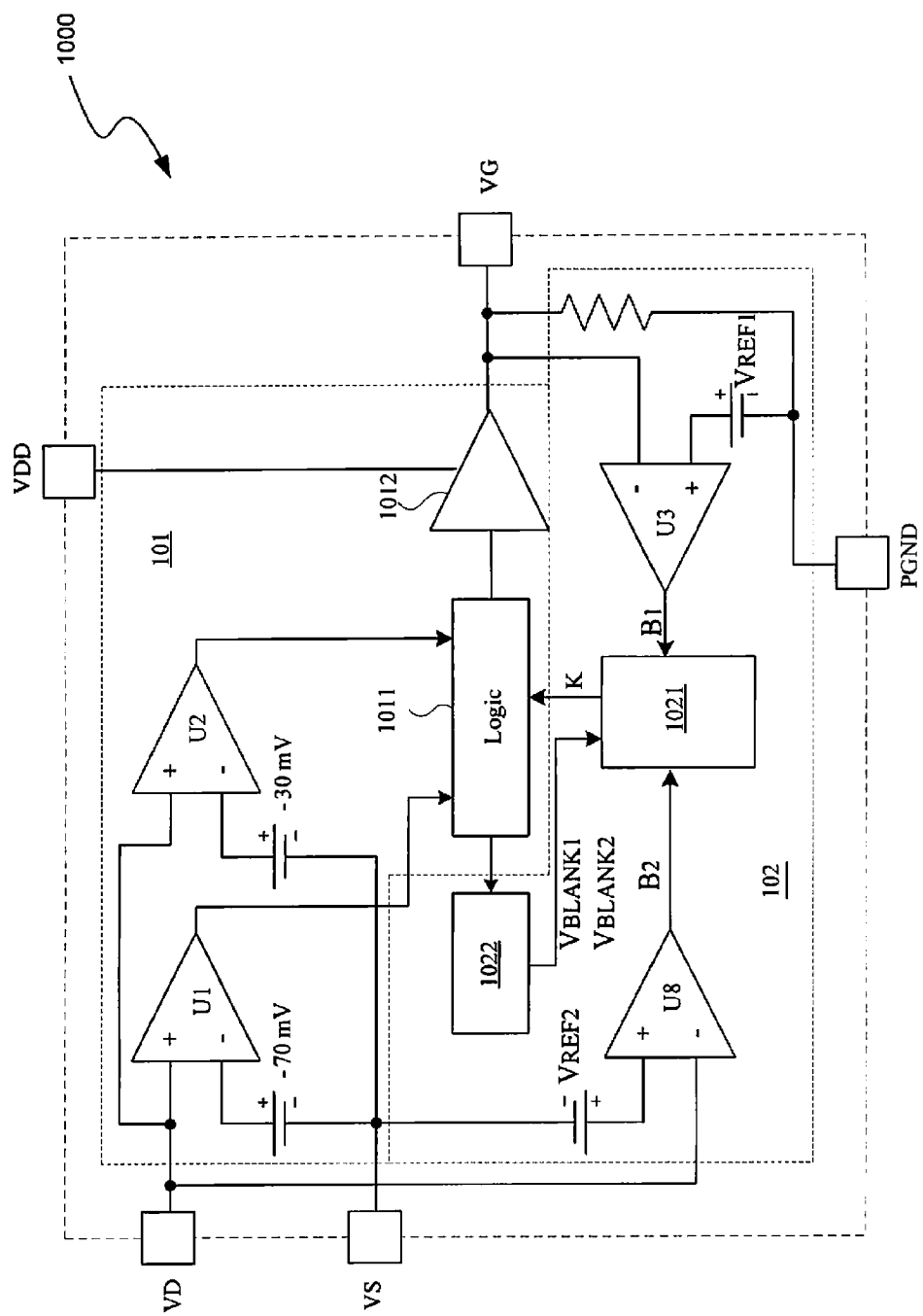
FIG. 10 shows a control circuit implementing the control method of FIG. 9.

FIG. 10 shows a control circuit 1000 implementing the control method in FIG. 9. The control circuit 1000 comprises external terminals of VD, VS, VG, VDD and PGND, which are connected with the drain of the rectifier, the source of the rectifier, the gate of the rectifier, the power supply and the ground respectively. The control circuit 1000 comprises internally a synchronous rectification circuit 101 and a light load control circuit 102. The synchronous rectification circuit 101 generates a synchronous rectification signal. In one example, the synchronous rectification signal is an interim signal within the synchronous rectification circuit 101. The synchronous rectification circuit 101 comprises in one embodiment a transconductance amplifier U1 and a comparator U2. The transconductance amplifier U1 is connected to the VD terminal at its non-inverting terminal and a reference signal (−70 mV as an example) at its inverting terminal. The comparator U2 is connected to the VD terminal and at its non-inverting terminal and another reference signal (−30 mV as an example) at its inverting terminal. The transconductance amplifier U1 is used to turn on a synchronous rectifier and the comparator U2 is used to turn off the synchronous rectifier. The synchronous rectification circuit 101 further comprises in one embodiment the driving logic circuit 1011 and the driving circuit 1012.

The driving logic circuit 1011 receives at its inputs the output of the transconductance amplifier U1, the output of the comparator U2, and the output of the light load control circuit 102 and puts out a driving signal to the driving circuit 1012. The driving logic circuit 1011 further outputs an ON signal to the light load control circuit 102. The ON signal represents the start of the ON state of the synchronous rectifier. The driving circuit 1012 outputs a gate control signal at the VG terminal. The driving logic circuit 1011 further generates the interim synchronous rectification signal according to the output of U1 and U2.

Continuing with FIG. 10, the light load control circuit 102 latches off synchronous rectification under sustained light load condition and enters back into synchronous rectification when heavy load condition is sensed. The light load control circuit 102 comprises a gate voltage comparator U3, a drain-source voltage comparator U8, a blanking time circuit 1022 and a latching circuit 1021. The comparator U3 compares $V_{GS}$ with a reference voltage $V_{REF1}$. The inverting terminal of U3 is connected to the terminal VG, and the non-inverting terminal receives the reference voltage $V_{REF1}$. U3 puts out a signal $B_1$ to the latching circuit 1021. The comparator U8 compares $V_{DS}$ with a reference voltage $V_{REF2}$. The inverting terminal of U8 is connected to the terminal VD, the non-inverting terminal is connected to a reference voltage $V_{REF2}$ where the other end of $V_{REF2}$ is connected to the terminal VS.

U8 puts out a signal $B_2$ to the latching circuit 1021. The blanking time circuit 1022 receives the ON signal from the driving logic circuit 1011 and puts out two blanking signals $V_{BLANK1}$ and $V_{BLANK2}$ to the latching circuit 1021. $V_{BLANK1}$ is set HIGH at the start of the ON state of the rectifier and lasts a time of T1. $V_{BLANK2}$ is set HIGH when current starts to flow through the body diode and lasts a time of T2. The latching circuit 1021 outputs the light load control signal K to the driving logic circuit 1011. In one embodiment, the driving logic circuit 1011 comprises an AND gate where the inputs of the AND gate receives the light load control signal K and the synchronous rectification signal. The output of the AND gate is connected to the driving circuit 1012. If K=0, $V_{GS}$ is LOW for the next cycle and the rectifier enters into non-synchronous rectification. If K=1, the rectifier works under synchronous rectification for the next cycle.

Figure 11A:
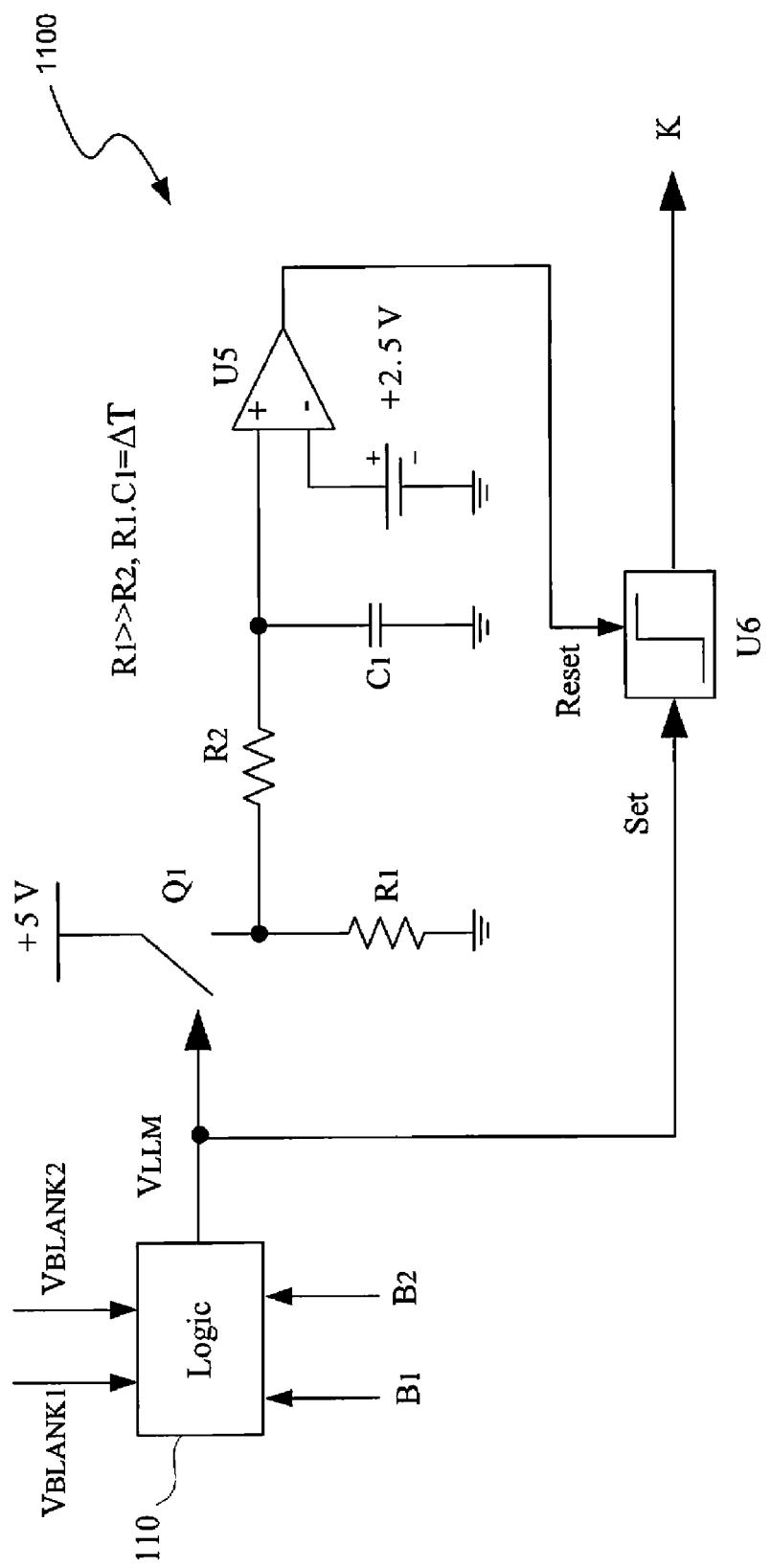
FIG. 11A shows a latching circuit of the control circuit shown in FIG. 10.

FIG. 11A shows an embodiment of a latching circuit 1100 as illustrated in FIG. 10. The latching circuit 1100 comprises a light load logic circuit 110, a charging circuit comprised of the resistor $R_1$, $R_2$ and a capacitor $C_1$, a switch $Q_1$, a comparator U5 and a monostable trigger U6 in one embodiment. The light load logic circuit 110 receives signals of $B_1$ from the gate voltage comparator U1, $B_2$ from the drain-source voltage comparator U8, $V_{BLANK1}$ and $V_{BLANK2}$ from the blanking time circuit 1022, and puts out a load indication signal $V_{LLM}$.

Figure 11B:
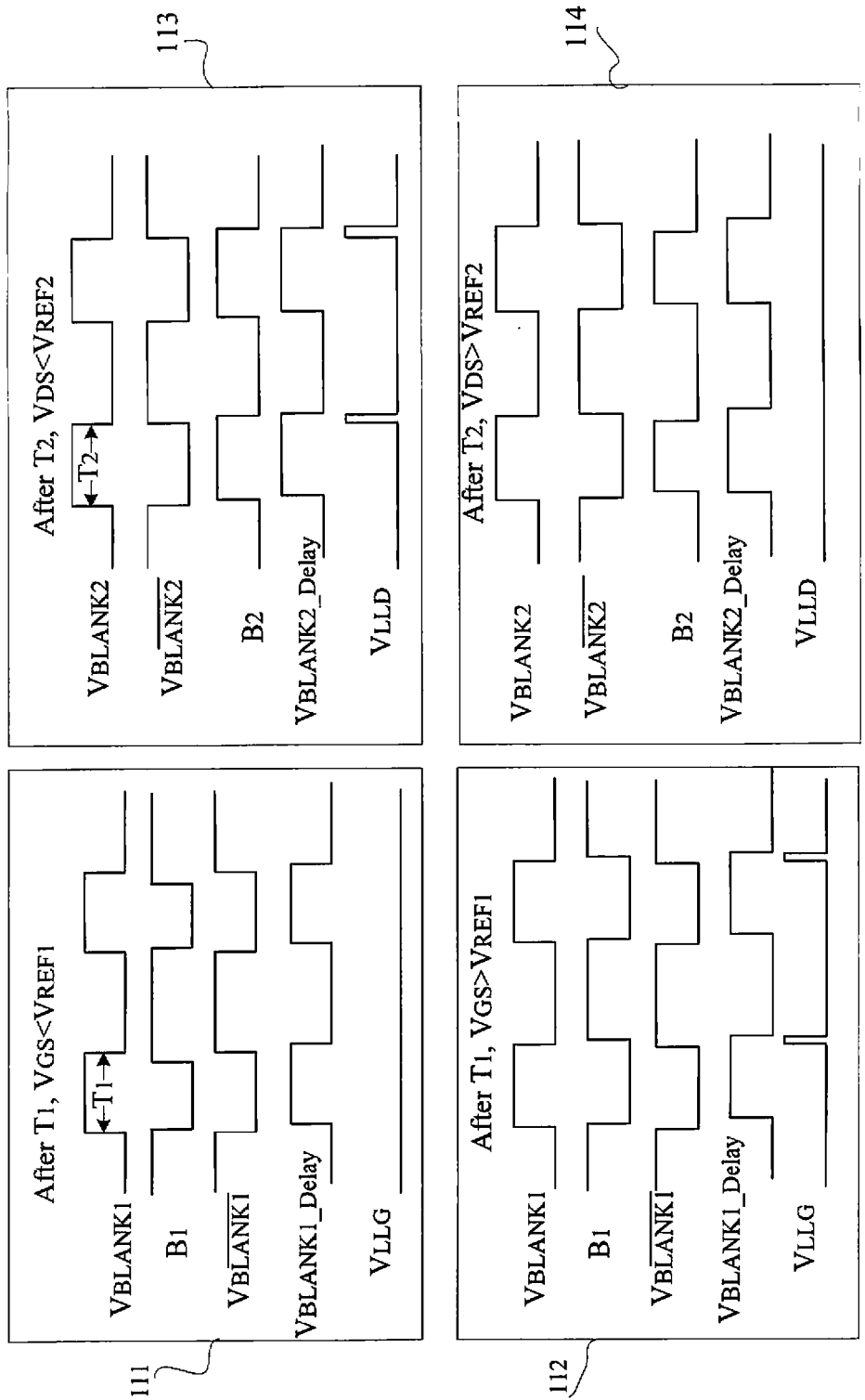
FIG. 11B shows a timing diagram of the light load logic circuit shown in FIG. 11A.

FIG. 11B shows the timing logic of the light load logic circuit 110. The light load circuit 110 generates two interim signals: $V_{LLG}$ and $V_{LLD}$. $V_{LLG}$ relates to synchronous rectification determined by $V_{GS}$ as shown in the left diagrams 111 and 112. $V_{GS}$ is compared with the reference voltage $V_{REF1}$ at the falling edge of $V_{BLANK1}$. In light load condition, $V_{GS}$<$V_{REF1}$, $B_1$ is HIGH and $V_{LLG}$ keeps LOW, referring to the upper diagram 111. In heavy load condition, $V_{GS}$>$V_{REF1}$, $B_1$ is LOW and $V_{LLG}$ presents a positive pulse (referring to the bottom diagram 112). Thus, $V_{LLG}$ is determined by a function of: $V_{LLG}=\overline{B_1} \times \overline{V_{BLANK1}} \times V_{BLANK1\_Delay}$, wherein $V_{BLANK1\_Delay}$ has a same waveform as $V_{BLANK1}$ but delays a predetermined short time. $V_{LLD}$ relates to non-synchronous rectification which is determined by $V_{DS}$ as showed in the right diagrams 113 and 114. $V_{DS}$ is compared with a reference voltage $V_{REF2}$ at the falling edge of $V_{BLANK2}$.

In heavy load condition, $V_{DS}$<$V_{REF2}$, $B_2$ is HIGH, and $V_{LLD}$ presents a positive pulse with certain duration (see waveforms 113). During light load condition, $V_{DS}$<$V_{REF2}$, $B_2$ is LOW, and $V_{LLD}$ keeps LOW (referring to waveforms 114). Thus, $V_{LLD}$ is determined by $V_{LLD}=B_2 \times \overline{V_{BLANK2}} \times V_{BLANK2\_Delay}$.

$V_{LLM}$ is get from an OR gate with inputs receiving signals of $V_{LLG}$ and $V_{LLD}$, that is $V_{LLM}=V_{LLG}+V_{LLD}$.

Referring back to FIG. 11A, at the leading edge of $V_{LLM}$, U6 is set HIGH (K=1). Meanwhile, $Q_1$ is turned on and $C_1$ is charged (to 5V as an example). When $V_{LLM}$ is LOW, $C_1$ is discharged through $R_1$ and $R_2$ wherein $R_1$ is substantially larger than $R_2$ and $R_1 * C_1 = \Delta T$. As a result, when $V_{LLM}$ is LOW for a time of $\Delta T$, and is discharged below a reference voltage (2.5V as an example), then U5 puts out LOW and reset U6 (K=0). If K=0, the rectifier works under non-synchronous rectification for the next cycle, and if K=1, the rectifier works under synchronous rectification for the next cycle.

Note that the present invention is not confined to flyback converter, DC-DC converters or AC-DC converters, and it is also applicable to the other converters or systems having a rectifier.

Though "leading edge", "falling edge", "HIGH", "LOW", "less" or other relative verbs are used, it is obvious to the person skilled in the art that the present invention can also be fulfilled when the opposite logic level is selected. Thus, features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. An apparatus comprising:
a synchronous rectification circuit coupled to a synchronous rectifier and configured to generate a synchronous rectification signal to control synchronous rectification of said synchronous rectification; and
a light load control circuit coupled to said synchronous rectifier, said light load control circuit receiving an input voltage to said synchronous rectifier, and selectively latching off synchronous rectification of said synchronous rectifier based upon at least said input voltage wherein said input voltage is the gate voltage of the synchronous rectifier.

2. The apparatus of claim 1, wherein said light load control circuit comprises:
a gate voltage comparator comparing the gate voltage with a first reference voltage; and
a latching circuit connected to an output terminal of said gate voltage comparator, the latching circuit outputting a light load control signal to selectively latch off synchronous rectification.

3. The apparatus of claim 2, wherein said light load control circuit further comprises a blanking time circuit with an input terminal connected to said synchronous rectification circuit and an output terminal connected to said latching circuit.

4. The apparatus of claim 3 wherein said synchronous rectification circuit comprises:
a transconductance amplifier that amplifies the differential voltage of a drain-source voltage of said synchronous rectifier and a second reference voltage; and
a comparator that compares the drain voltage of said synchronous rectifier with a third reference voltage;
said synchronous rectification signal is generated according to the output terminal of said transconductance amplifier and output terminal of said comparator of synchronous rectification circuit.

5. The apparatus of claim 4, wherein said synchronous rectification circuit further comprises an AND gate, a first input terminal of said AND gate receiving said synchronous rectification signal and a second input terminal of said AND gate receiving said light load control signal.

6. The apparatus of claim 3, wherein said light load control circuit further comprises a drain-source voltage comparator that compares the drain-source voltage with a fourth reference voltage.

7. The apparatus of claim 3, wherein said latching circuit comprises:
a light load logic circuit with a first input terminal connected to the output terminal of said gate voltage comparator, a second input terminal connected to the output terminal of said blanking time circuit, and an output terminal outputting a load indication signal;
a charging circuit comprising a capacitor, charged at a first state of said load indication signal and discharged at a second state of said load indication signal;
a comparator that comparing a charging circuit voltage with a fifth reference voltage; and
a monostable trigger set HIGH by said load indication signal and set LOW by said comparator.

8. The apparatus of claim 7, wherein said load indication signal is determined by: at the falling edge of a blanking signal of said blanking time circuit, set LOW at a first state of said gate voltage comparator, or presenting a positive pulse at a second state of said gate voltage comparator.

9. The apparatus of claim 8, wherein said latching circuit further comprises:
a counter connected to a drain-source voltage comparator or a drain-source voltage amplifier, and said monostable trigger; and
an OR gate, comprising a first input terminal connected to the output terminal of said monostable trigger, a second input terminal of said OR gate connected to the output terminal of said counter, and an output terminal putting out said light load control signal.

10. The apparatus of claim 9, wherein said counter counts by the output of said drain-source voltage comparator or drain-source voltage amplifier, overflows at a predetermined number, and is reset by the output of said monostable trigger.

11. The apparatus of claim 1, wherein said light load control circuit further receiving the output voltage of said synchronous rectifier, and selectively enters back into synchronous rectification according to said output voltage; and wherein said light load control circuit comprises:
a gate voltage comparator comparing the gate voltage with the first reference voltage;
a drain-source voltage comparator, comparing the drain-source voltage with the second reference voltage; and
a latching circuit, coupled to said gate voltage comparator and said drain-source voltage comparator, and outputting a light load control signal to selectively latch off synchronous rectification.

12. The apparatus of claim 11, wherein said light load control circuit further comprises a blanking time circuit, with input terminal connected to said synchronous rectification circuit and output terminal connected to said latching circuit.

13. The apparatus of claim 11, wherein said light load logic circuit generates:
a first interim signal, at the falling edge of a first blanking signal of said blanking time circuit, set LOW at a first state of said gate voltage comparator, or presenting a positive pulse at a second state of said gate voltage comparator; and
a second interim signal, at the falling edge of a second blanking signal of said blanking time circuit, presenting a positive pulse at a first state of said drain-source voltage comparator, or set LOW at a second state of said drain-source voltage comparator;
and said load indication signal, is an OR computation of said first interim signal and said second interim signal.

14. A control circuit, coupled to a synchronous rectifier, said control circuit configured to receive the input signal of said synchronous rectifier and selectively turn off synchronous rectification of said synchronous rectifier according to said input signal, wherein said input signal is the gate voltage.

15. The circuit of claim 14, wherein the control circuit is further configured to receive the drain-source voltage of said synchronous rectifier.

16. A control method for a synchronous rectifier comprising selectively latching off synchronous rectification according to an input voltage of said synchronous rectifier wherein said input voltage is the gate voltage of the synchronous rectifier.

17. The control method of claim 16, wherein during synchronous rectification, when light load condition is sensed for a preset number of cycles, latching off synchronous rectification, said light load condition sensed when the gate voltage of said synchronous rectifier is less than a first reference voltage after a first blanking time from the ON state of said synchronous rectifier.

18. The method of claim 17, wherein synchronous rectification is latched off when light load condition is sensed for a predetermined duration.

19. The method of claim 18, wherein during non-synchronous rectification, said synchronous rectifier enters into synchronous rectification after a preset number of cycles.

20. The method of claim 19, wherein during synchronous rectification after several cycles of said non-synchronous rectification, if light load condition is sensed, synchronous rectification is latched off, and if heavy load condition is sensed, continues synchronous rectification.

21. The method of claim 19, wherein during startup, synchronous rectification is turned on.

22. The method of claim 19, wherein during non-synchronous rectification, the synchronous rectifier enters into synchronous rectification according to the drain-source voltage of said synchronous rectifier.

23. The method of claim 17, wherein when heavy load is sensed, entering into synchronous rectification, said heavy load condition sensed when the drain-source voltage of said synchronous rectifier is less than a second reference voltage after a second blanking time from the ON state of the body diode of said synchronous rectifier.

* * * * *